«12» United States Patent
Sano et al.

(10) Patent No.: US 9,785,193 B2
(45) Date of Patent: Oct. 10, 2017

(54) KEYBOARD AND TERMINAL DEVICE

(71) Applicant: Sony Corporation, Tokyo (JP)

(72) Inventors: Tatsuya Sano, Tokyo (JP); Tamio Nishino, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 337 days.

(21) Appl. No.: 14/547,805

(22) Filed: Nov. 19, 2014

(65) Prior Publication Data
US 2016/0139679 A1 May 19, 2016

(51) Int. Cl.
*G06F 1/16* (2006.01)
(52) U.S. Cl.
CPC .......... *G06F 1/1654* (2013.01); *G06F 1/1632* (2013.01)
(58) Field of Classification Search
CPC .............................. G06F 1/1632; G06F 1/1626
USPC ........................................ 361/679.29, 679.17
See application file for complete search history.

(56) References Cited

U.S. PATENT DOCUMENTS

| | | | | |
|---|---|---|---|---|
| 6,581,420 B1 * | 6/2003 | Ling | .................... | E05B 73/0082 248/551 |
| 7,381,075 B2 * | 6/2008 | Gontarek | ............ | B60R 11/0241 361/679.41 |
| 8,325,476 B2 * | 12/2012 | Huang | ................... | G06F 1/1626 312/223.1 |
| 8,568,154 B2 * | 10/2013 | Chang | ................ | H01R 13/6315 439/173 |
| 2006/0250764 A1 * | 11/2006 | Howarth | ............... | G06F 1/1632 361/679.41 |
| 2012/0037771 A1 * | 2/2012 | Kitchen | ................ | G06F 1/1632 248/223.41 |
| 2013/0142371 A1 * | 6/2013 | Martin | ................... | H04R 1/025 381/333 |
| 2013/0188304 A1 * | 7/2013 | Lee | ........................ | G06F 1/1667 361/679.12 |
| 2014/0111923 A1 * | 4/2014 | Hu | ........................... | G06F 3/02 361/679.2 |
| 2014/0347802 A1 * | 11/2014 | Lee | ........................ | G06F 1/1632 361/679.17 |
| 2014/0375248 A1 * | 12/2014 | Takahashi | ............. | H02J 7/0044 320/107 |
| 2015/0036139 A1 * | 2/2015 | Hsu | ....................... | G06F 1/1632 356/402 |

(Continued)

FOREIGN PATENT DOCUMENTS

JP   2013-232049   11/2013

*Primary Examiner* — Adrian S Wilson
*Assistant Examiner* — Abhishek Rathod
(74) *Attorney, Agent, or Firm* — Oblon, McClelland, Maier & Neustadt, L.L.P.

(57) ABSTRACT

A device includes a holder attached to the casing that is configured to hold an edge of a terminal device. A first clamper is arranged on a first wall of the holder, and a second clamper is arranged on a second wall opposing the first wall so that the first clamper faces the second clamper to exert a pinching force on the edge of the terminal device. A clamper interlocking component decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder.

20 Claims, 9 Drawing Sheets

(56) References Cited

U.S. PATENT DOCUMENTS

| | | | |
|---|---|---|---|
| 2015/0055289 A1* | 2/2015 | Chang .................. | G06F 1/1632 361/679.43 |
| 2015/0138721 A1* | 5/2015 | Liang ................... | G06F 1/1632 361/679.44 |

* cited by examiner

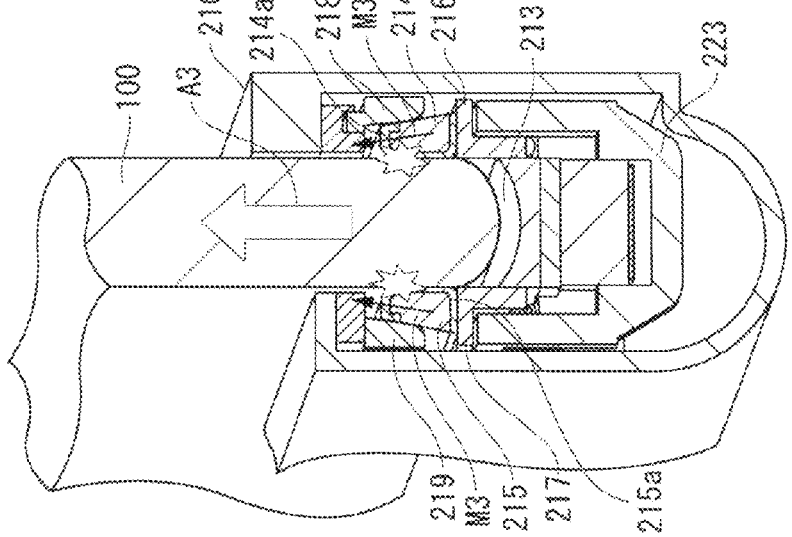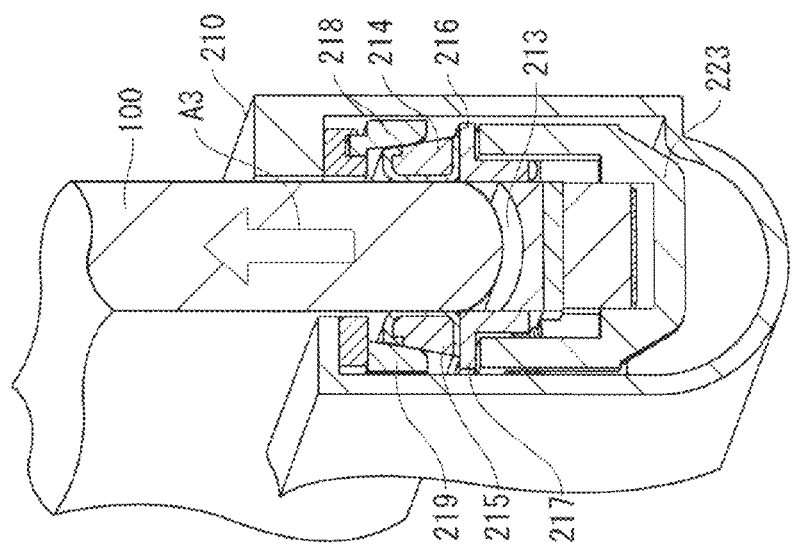

KEYBOARD AND TERMINAL DEVICE

BACKGROUND

Technical Field

The present disclosure is directed to a device for holding a terminal device, such as a tablet, and a terminal device with a keyboard.

Description of Related Art

In recent years, terminal devices, such as tablets, have been and have become increasingly popular. Keyboard devices allow users to input characters at the terminal devices and have mechanisms for connecting to the terminal devices. For example, the mechanisms may include magnets that magnetically connect the keyboard device to metallic edges of the terminal device so that the keyboard device and the terminal device are integrally connected. However, keyboard devices with magnetic mechanisms can only connect to terminal devices having metallic edges, and the magnetic field of the magnetic mechanism can react adversely with other electronic devices or magnetic cards.

The keyboard device can also include at least one clip mechanism that attaches to an edge of the terminal device to connect the keyboard device to the terminal device. The clip mechanisms can damage the surface of the terminal device if the force with which the clip mechanisms attach to the terminal device is stronger than the material strength of the surface of the terminal device. However, if the force with which the clip mechanisms attach to the terminal device is too weak, the terminal device may inadvertently separate from the keyboard device.

SUMMARY

According to one exemplary embodiment, the disclosure is directed to a device that includes a holder attached to the casing that is configured to hold an edge of a terminal device. A first clamper is arranged on a first wall of the holder, and a second clamper is arranged on a second wall opposing the first wall so that the first clamper faces the second clamper to exert a pinching force on the edge of the terminal device. A clamper interlocking component decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder.

According to another exemplary embodiment, the disclosure is directed to a system including a terminal device with a display and a device having a holder attached to the casing that is configured to hold an edge of a terminal device. A first clamper is arranged on a first wall of the holder, and a second clamper is arranged on a second wall opposing the first wall so that the first clamper faces the second clamper to exert a pinching force on the edge of the terminal device. A clamper interlocking component decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 9A-9C are exemplary illustrations of an attempt to pull a terminal device from a holder when the release button is in a locked position, according to certain embodiments.

DETAILED DESCRIPTION

Figure 1A:
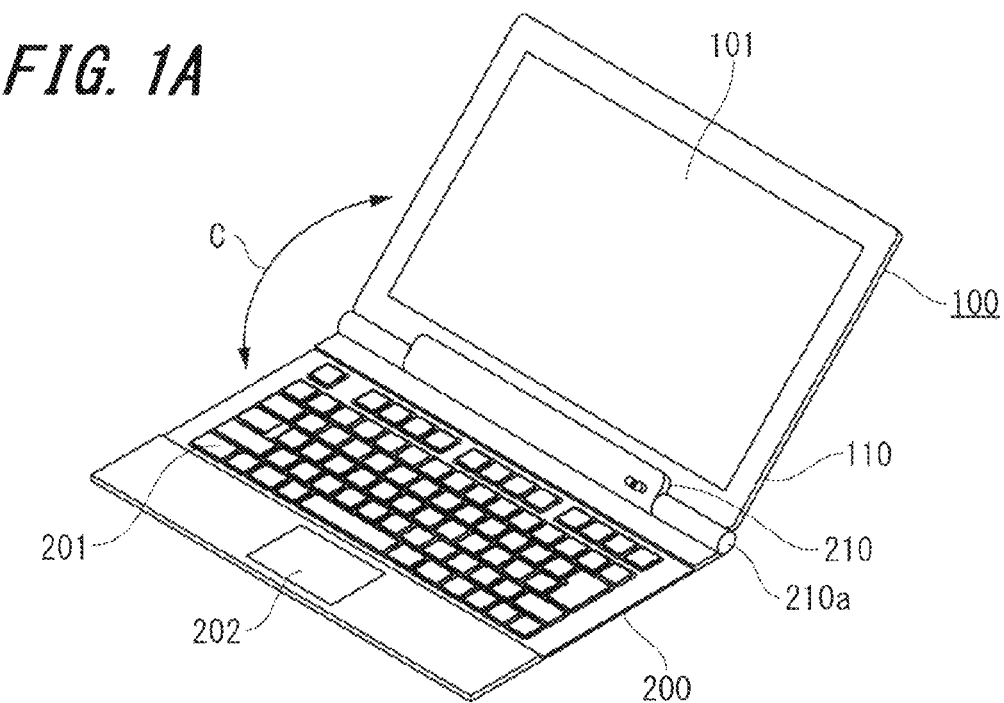
FIG. 1A is an exemplary illustration of a terminal device connected to a keyboard device, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

Figure 1B:
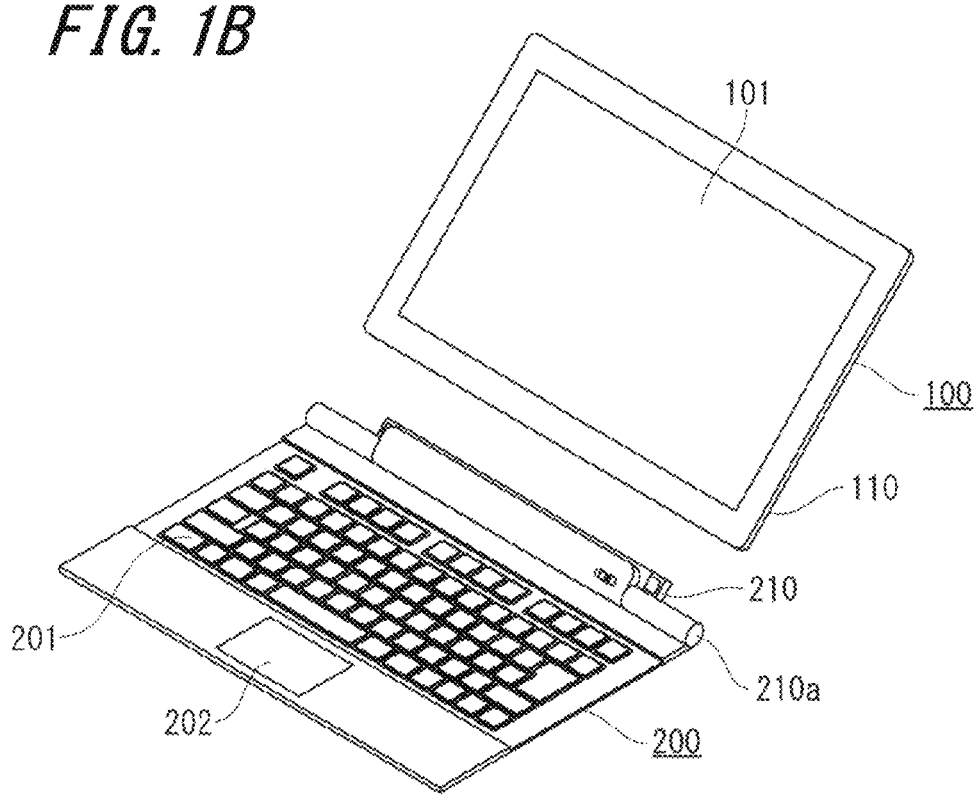
FIG. 1B is an exemplary illustration of a terminal device separated from a keyboard device, according to certain embodiments.

FIGS. 1A and 1B are exemplary illustrations of a terminal device 100 and a keyboard device 200, according to certain embodiments. FIG. 1A illustrates a terminal device 100 connected to a keyboard device 200, and FIG. 1B illustrates a terminal device 100 separated from a keyboard device 200. The terminal device 100 includes a display 101 on a surface of the terminal device and an edge 110 that extends around a perimeter of the terminal device 100.

The keyboard device 200 includes a casing with one or more keys 201, touchpads 202, buttons, and the like on a surface of the keyboard device 200. The keyboard device 200 also includes a holder 210 that is attached to the keyboard device 200 at an approximately rear edge of the keyboard device 200. The keyboard device 200 connects to the terminal device 100 by holding the edge 110 within the holder 210, and in some embodiments, a length of the edge 110 that is inserted into the holder 210 is approximately equal to a length of the rear edge of the keyboard device 200. The holder 210 also includes a rotating mechanism 210a such that when the terminal device 100 is inserted into the holder 210, the terminal device 100 can rotate in the direction of angle C, as shown in FIG. 1A. However, in some implementations, the holder 210 may not include the rotating mechanism 210a so that the terminal device 100 remains at a fixed angle when inserted into the holder 210.

Figure 2:
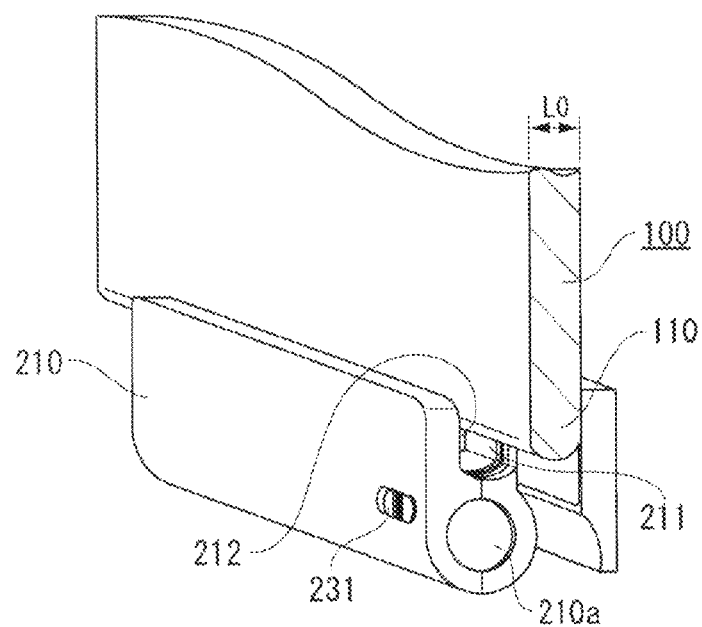
FIG. 2 is an exemplary cross-sectional view of a terminal device being inserted into a holder of a keyboard device, according to certain embodiments.

FIG. 2 is an exemplary cross-sectional view of a terminal device 100 being inserted into a holder 210 of a keyboard device 200, according to certain embodiments. The holder 210 includes a groove where the terminal device 100 can be inserted with opposing walls 211 and 212. A distance between the walls 211 and 212 is greater than a thickness L0 of the terminal device 100 such that the terminal device 100 can be inserted into the holder 210 smoothly. A release button 231 on the holder 210 can be placed in a locked position or a release position based on whether the terminal device 100 is being inserted, removed, or held in place by the holder 210. The position of the release button 231 on the holder 210 is exemplary and may be positioned at other locations on the holder 210. Details regarding the release button 231 are discussed further herein.

Figure 3:
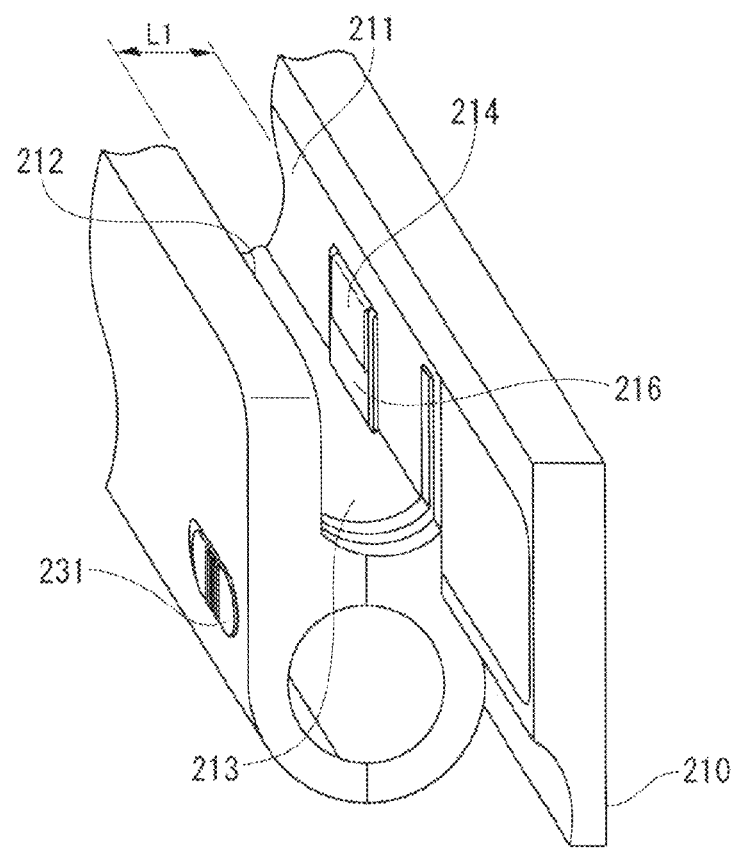
FIG. 3 is an exemplary illustration of a holder of a keyboard device, according to certain embodiments.

FIG. 3 is an exemplary illustration of a holder 210 of a keyboard device 200, according to certain embodiments. The groove where the terminal device 100 can be inserted in the holder 210 includes a bottom surface 213 and opposing walls 211 and 212. The walls 211 and 212 are separated by a distance L1 that is greater than the thickness L0 of the terminal device 100 such that the terminal device 100 can be inserted smoothly into the holder 210 while still being able to hold the terminal device 100 in place.

A clamper 214 is arranged on the wall 211 at an approximate middle of the length of the wall 211, and a clamper 215 (not shown) is arranged on the opposing wall 212 at an approximate middle of the opposing wall 212 such that the clamper 215 faces the clamper 214. In certain embodiments, two or more clampers can be arranged on the walls 211 and 212 and are spaced at predetermined distances on the walls 211 and 212.

When the terminal device 100 is inserted into the holder 210, the clampers 214 and 215 pinch a front surface and a back surface of the terminal device 100 to hold the terminal device 100 in place. The force with which the clampers 214 and 215 pinch the front and back surfaces of the terminal device 100 is based on an insertion state and pulling-away state of the terminal device 100 within the holder 210. For example, the force with which the clampers 214 and 215 pinch a terminal device 100 that is fully inserted into the holder 210 may be equal to the strength with which the clampers 214 and 215 pinch a terminal device 100 that is partially inserted into the holder 210. However, the force with which the clampers 214 and 215 pinch a terminal device 100 that is pulled away from the holder 210 may be greater than the strength with which the clampers 214 and 215 pinch a terminal device 100 that is fully inserted or partially inserted into the holder 210.

Figure 4:
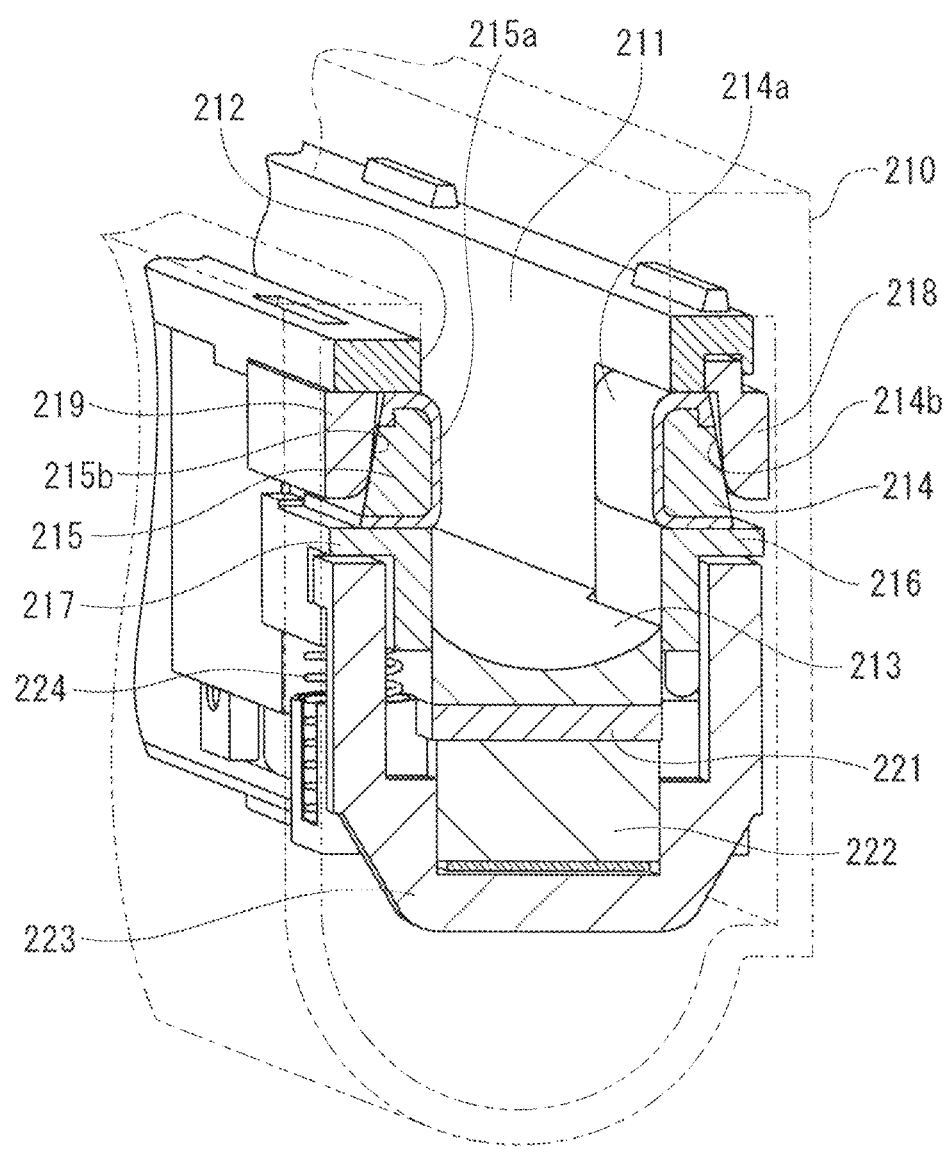
FIG. 4 is an exemplary cross-sectional view of an internal structure of a keyboard device holder, according to certain embodiments.

FIG. 4 is an exemplary cross-sectional view of an internal structure of a holder 210, according to certain embodiments. The cross-sectional view of the holder 210 is taken at a location where the clampers 214 and 215 are attached to the walls 211 and 212. The clampers 214 and 215 are positioned on the walls 211 and 212 such that the clamper 214 directly faces the clamper 215. The clamper 214 has a front surface 214a and the clamper 215 has a front surface 215a that make contact with the terminal device 100 that is inserted into the holder 210. The front surfaces 214a and 215a can be made of materials that have coefficients of friction greater than a predetermined threshold to reduce the likelihood that the terminal device 100 will inadvertently slide out of the holder 210 of the keyboard device 200. For example, the front surfaces 214a and 215a of the clampers 214 and 215 may be made of rubber or other materials with coefficients of friction greater than the predetermined threshold may reduce the likelihood that the table terminal 100 will inadvertently slide out of the holder 210. In some implementations, the front surfaces 214a and 215a may also be made of materials having coefficients of friction that are less than the predetermined threshold.

In certain embodiments, the clampers 214 and 215 are positioned within the holder 210 such that the clampers 214 and 215 move in upward and downward directions. In addition, back surfaces of the clampers 214 and 215 have tapered surfaces 214b and 215b. Tapered surface 214b makes contact with guide member 218 as the clamper 214 slides up and down, and tapered surface 215b makes contact with guide member 219 as the clamper 215 slides up and down. The angle of the tapered surfaces 214b and 215b allow the front surfaces 214a and 215a to move inward and outward with respect to the walls 211 and 212 as the clampers 214 and 215 slide upward and downward. FIG. 4 illustrates a state where the clampers 214 and 215 are at an uppermost state within the holder 210. At the uppermost state, an amount that the front surfaces 214a and 215a protrude from the walls 211 and 212 is at a maximum. As the clampers 214 and 215 move in the downward direction, the amount that the front surfaces 214a and 215a protrude from the walls 211 and 212 decreases until the clampers 214 and 215 reach a lowermost state. At the lowermost state, the amount that the front surfaces 214a and 215a protrude from the walls 211 and 212 is at a minimum.

A u-shaped clamper interlocking component 223 is located underneath the clampers 214 and 215 within the holder 210 and makes contact with support members 216 and 217. The support member 216 is located between the clamper interlocking component 223 and the clamper 214, and the supporting member 217 is located between the clamper interlocking component and the clamper 215. As the clamper interlocking component 223 and the support members 216 and 217 slide upward and downward within the holder 210, the clampers 214 and 215 move upward and downward due to the upward and downward movement of the clamper interlocking component 223.

A coil-shaped spring 224 is positioned between a main body of the holder 210 and the support member 217 and provides an upward force on the supporting member 217. When the upward force of the spring 224 is acting on the support member 217, the clamper interlocking component 223 pushes up on the clampers 214 and 215 via the support members 216 and 217. Therefore, when the table terminal 100 is not inserted into the holder 210 and the release button 231 is in a locked position, the clampers 214 and 215 will be in the uppermost state due to the upward force exerted by the spring 224. Details regarding the release position of the release button 231 are discussed further herein.

In certain embodiments, a baseplate 221 is connected to the clamper interlocking component 223 via a spacer 222. In addition, a gap exists between the spacer 222 and the clamper interlocking component 223 such that a front end of a release component can be inserted into the gap between the spacer 222 and the clamper interlocking component 223. Details regarding the release component are discussed further herein.

Figure 5:
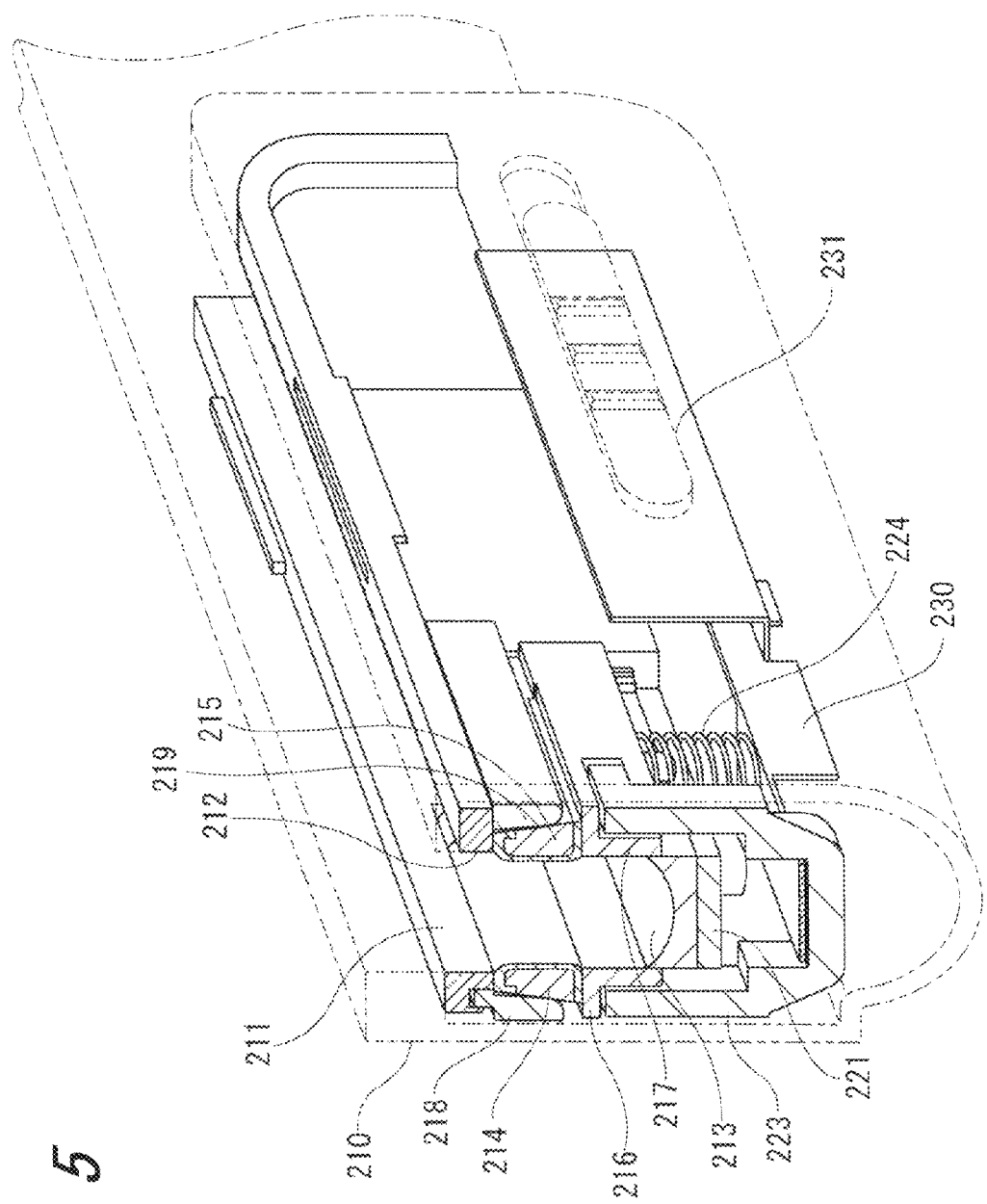
FIG. 5 is an exemplary illustration of a release button in a locked position, according to certain embodiments.

FIG. 5 is an exemplary illustration of a release button 231 in a locked position, according to certain embodiments. After the terminal device 100 is placed into the holder 210, the release button 231 is slid to a locked position to ensure that the terminal device 100 remains connected to the keyboard device 200. The release button 231 is connected to the holder 210 and controls the motion of the clamper interlocking component 223 via the release component 230. When a user slides the release button 231 to the locked position, the release component 230 does not restrict the motion of the clamper interlocking component 223. For example, when the release button 231 is in the locked position, the clamper interlocking component 223 can move up and down based on a position of the terminal device 100 within the holder 210. As the clamper interlocking component 223 moves up and down, the clampers 214 and 215 also move up and down to maintain contact with the terminal device 100.

Figure 6:
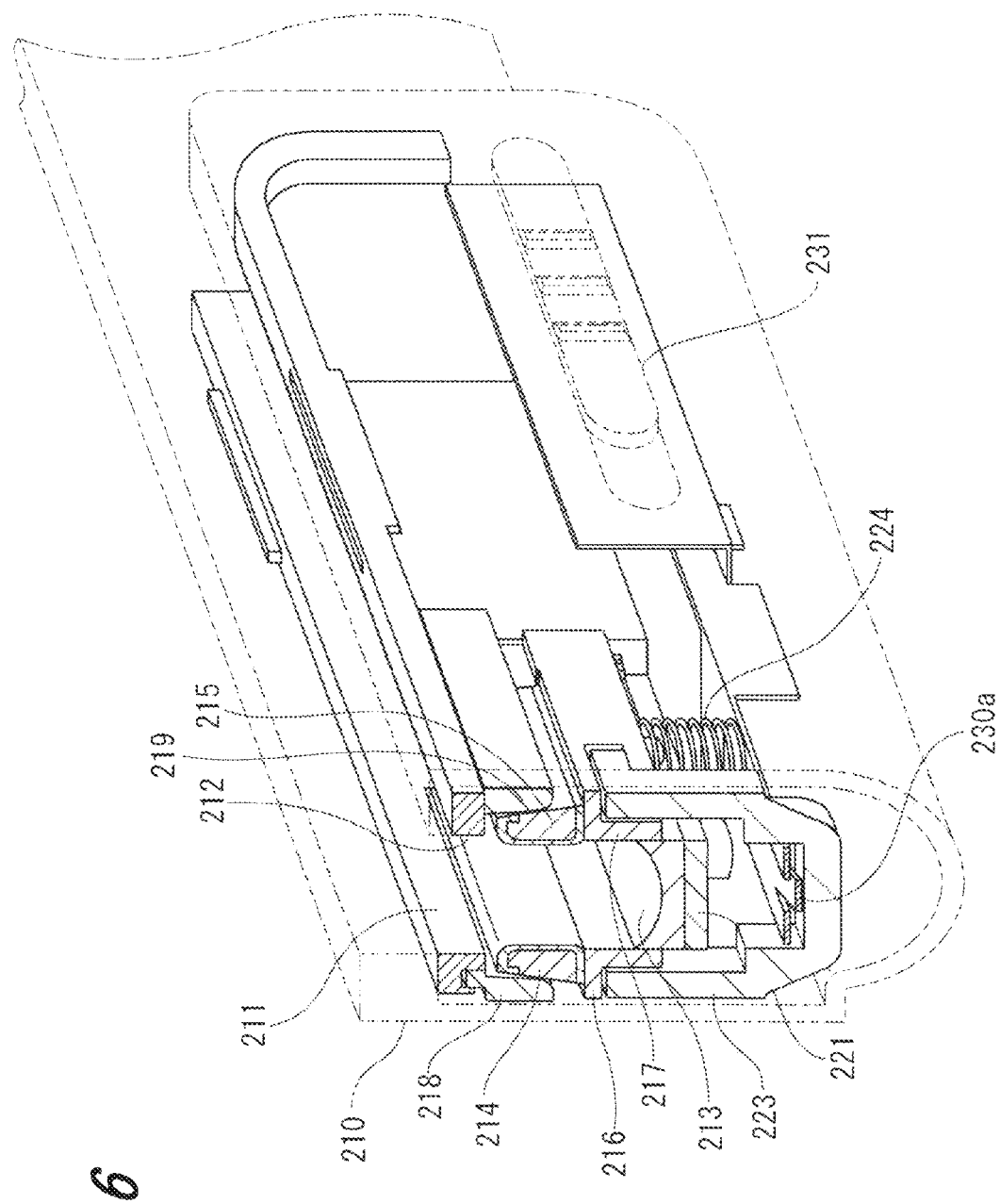
FIG. 6 is an exemplary illustration of a release button in a release position, according to certain embodiments.

FIG. 6 is an exemplary illustration of a release button 231 in a release position, according to certain embodiments. When the user removes the terminal device 100 from the holder 210 of the keyboard device 200, he or she slides the release button 231 to the release position. When the release button 231 is in the release position, the front end of the release component 230a is inserted into the gap between the clamper interlocking component 223 and the spacer 222 which causes the clamper interlocking component 223 to be maintained at a lowermost state, which limits the pinching force exerted by the clampers 214 and 215. When the clamper interlocking component 223 is in the lowermost state, the clampers 214 and 215 are also in the lowermost state, which causes the front surfaces 214a and 215a of the clampers 214 and 215 to protrude from the walls 211 and 212 by the minimum amount.

Figure 7:
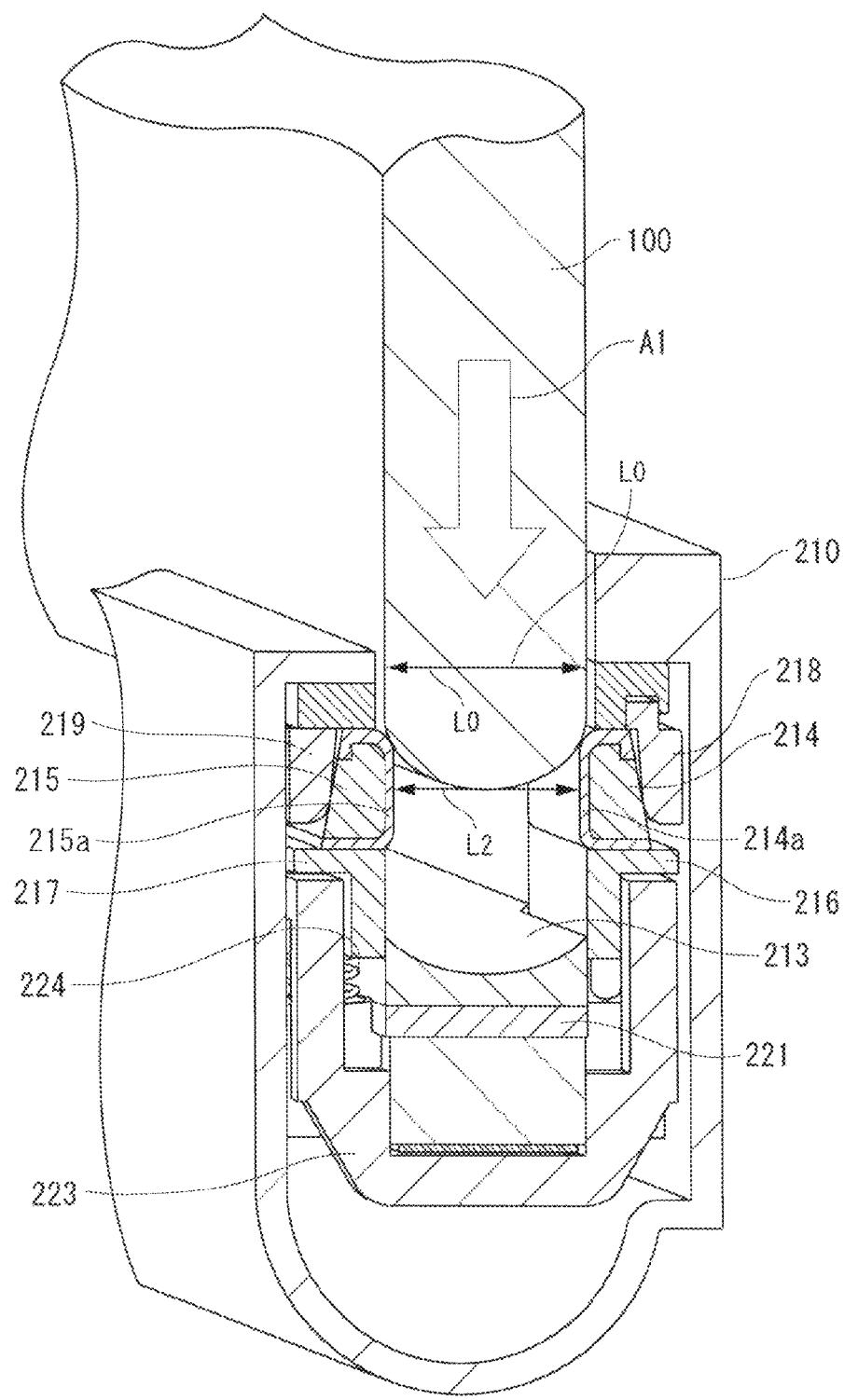
FIG. 7 is an exemplary illustration of the clampers as a terminal device is being inserted into a holder, according to certain embodiments.

FIG. 7 is an exemplary illustration of the clampers 214 and 215 as a terminal device 100 is being inserted into a holder, according to certain embodiments. The edge 110 of the terminal device 100 is inserted into the holder 210 in the direction of arrow A1. In the example illustrated by FIG. 7, the clampers 214 and 215 are slid to the uppermost state where the amount by which the front surfaces 214a and 215a protrude from the walls 211 and 212 is at a maximum. A shortest distance L2 between the front surfaces 214a and 215a of the clampers 214 and 215 is less than the thickness L0 of the terminal device 100 so that the terminal device 100 makes contact with the clampers 214 and 215 as the terminal device 100 is inserted into the holder 210.

Figure 8:
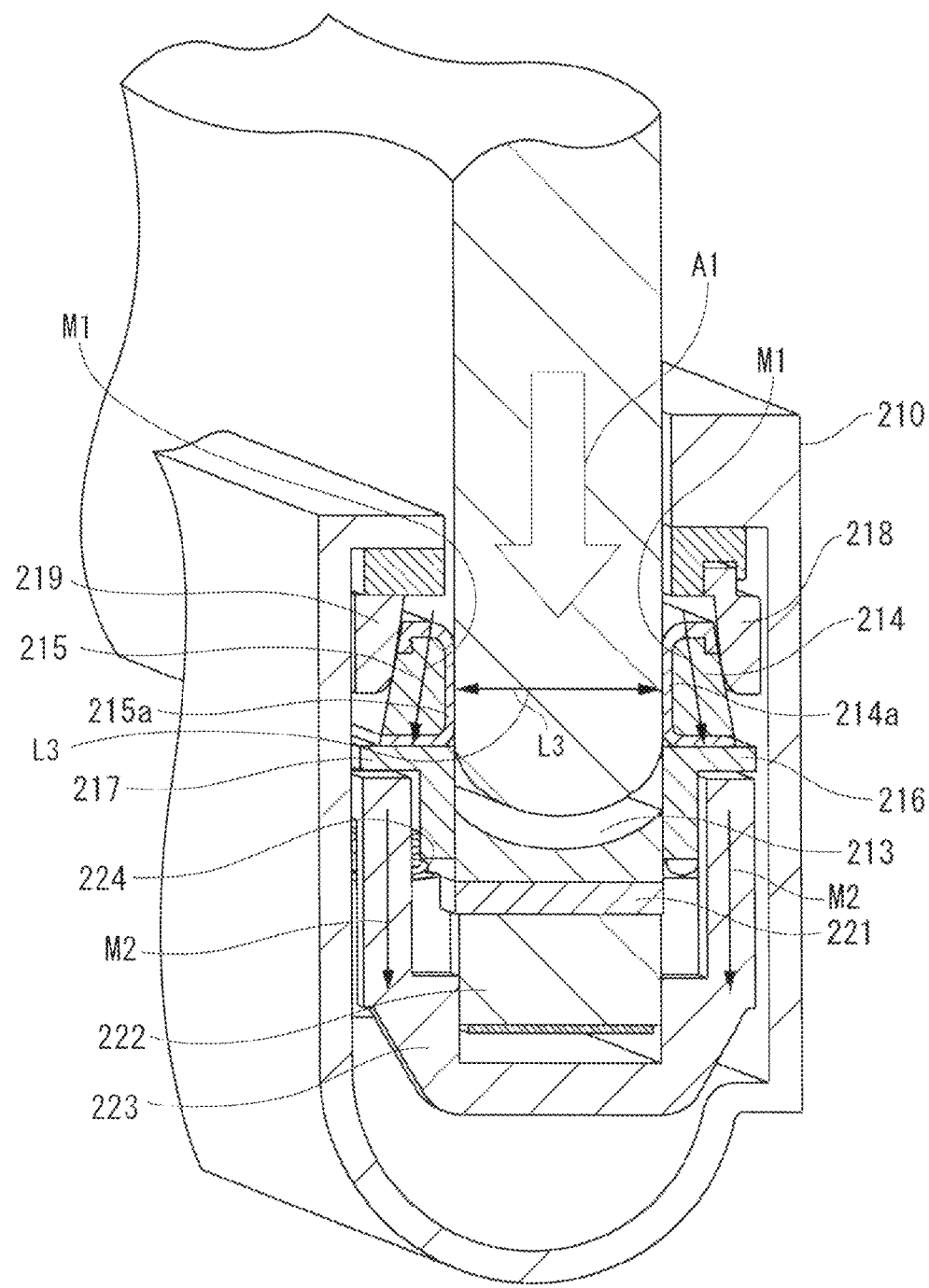
FIG. 8 is an exemplary illustration of the clampers when a terminal device is inserted into the holder, according to certain embodiments.

FIG. 8 is an exemplary illustration of the clampers 214 and 215 when a terminal device 100 is inserted into the holder 210, according to certain embodiments. The example illustrated by FIG. 8 shows the movement of components of the holder 210 as the terminal device 100 is inserted into the holder 210 in the direction of arrow A1. As the terminal device 100 is inserted into the holder 210, the clampers 214 and 215 are pushed in downward and outward directions by the terminal device 100 so that the amount by which the front surfaces 214a and 215a of the clampers 214 and 215 protrude from the walls 211 and 212 is reduced. For example, arrow M1 illustrates the downward and outward angle of motion for the clampers 214 and 215 as the terminal device 100 is inserted into the holder 210 due to the contact of the tapered surfaces 214b and 215b with the guide members 218 and 219. In certain embodiments, arrow M2 illustrates the downward motion of the clamper interlocking component 223 in response to the downward and outward motion of the clampers 214 and 215. In addition, the distance between the clampers 214 and 215 when the terminal device 100 is fully inserted into the holder 210 increases to a distance L3 that is greater than the distance L2. When the terminal device 100 is fully inserted into the holder 210, the pinching force exerted by the clampers 214 and 215 on the terminal device 100 is generated by the spring 224 and is smaller than the pinching force exerted by the clampers 214 and 215 on the terminal device 100 as it is pulled in an outward direction. The smaller pinching force exerted by the clampers 214 and 215 may reduce the likelihood that the front and back surfaces of the terminal device 100 are damaged due to contact with the clampers 214 and 215.

FIGS. 9A-9C are exemplary illustrations of an attempt to pull a terminal device 100 from a holder 210 when the release button 231 is in a locked position, according to certain embodiments. FIG. 9A illustrates an example of an upward force being exerted on the terminal device 100 by a user in the direction of arrow A3.

FIG. 9B illustrates the motion of the clampers 214 and 215 as the terminal device 100 is moved in the upward direction of arrow A3. For example, as the terminal device 100 is pulled upward, the clampers 214 and 215 move in the direction of arrow M3 to maintain contact with the terminal device 100 as it is pulled in the direction of arrow A3. In addition, as the clampers 214 and 215 move upward in the direction of arrow M3, the distance L3 between the front surfaces 214a and 215a of the clampers 214 and 215 decreases due to the contact of the tapered surfaces 214b and 215b on the back surfaces of the clampers 214 and 215 with the guide members 218 and 219.

As the distance L3 between the front surfaces 214a and 215a decreases when the terminal device 100 is pulled in the direction of arrow A3, the force with which the clampers 214 and 215 pinch the terminal device 100 increases. FIG. 9C illustrates the direction of the pinching force M4 of the clampers 214 and 215 as the terminal device 100 is pulled in the direction of arrow A3. The pinching force M4 increases as the clampers 214 and 215 move upward and the distance L3 between the front surfaces 214a and 215a decreases so that the terminal device 100 may be prevented from being removed from the holder 210 when the release button 231 is in the locked position.

Figure 10:
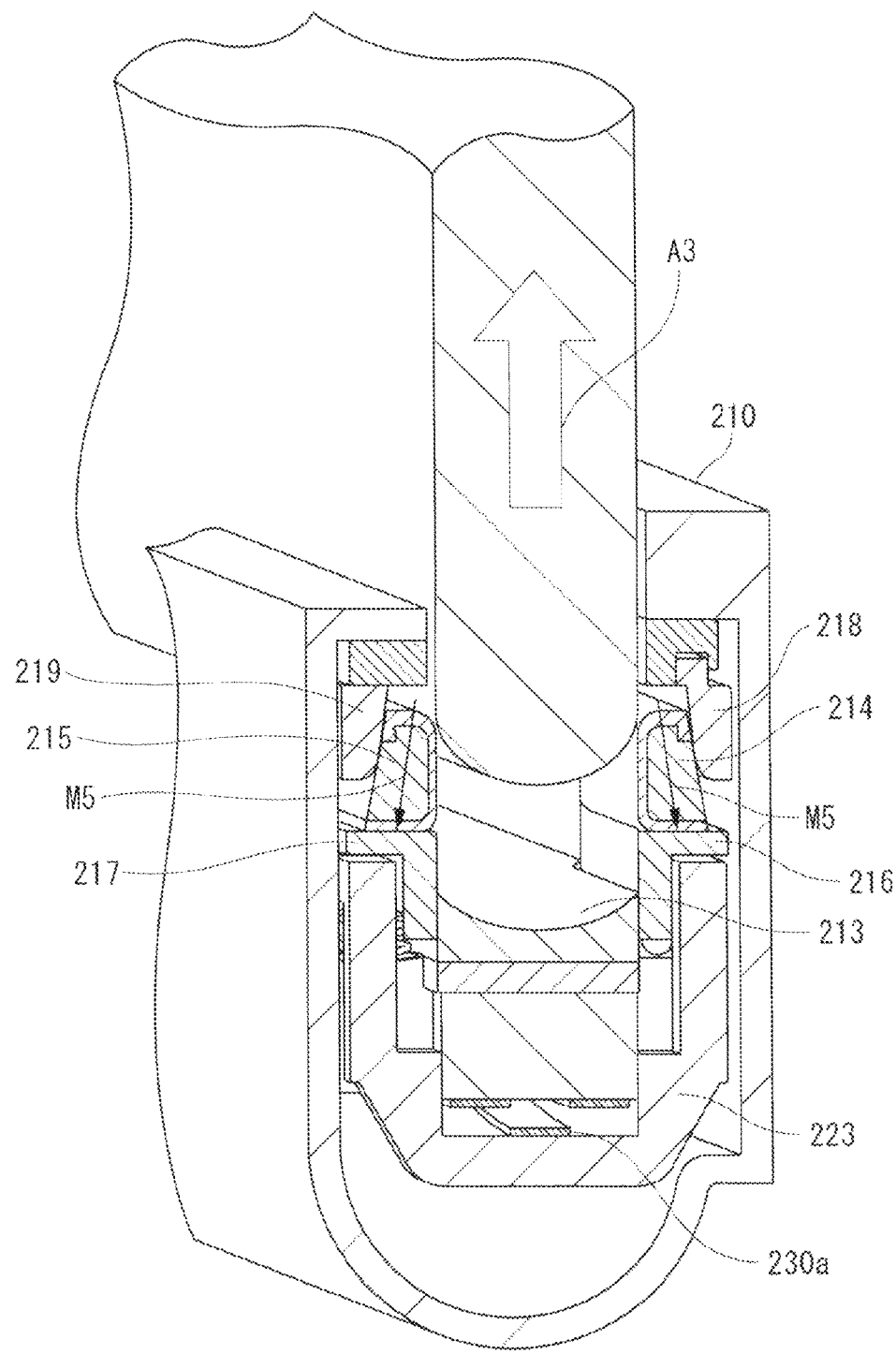
FIG. 10 is an exemplary illustration of the clampers when a release button is in a release position, according to certain embodiments.

FIG. 10 is an exemplary illustration of an attempt to pull a terminal device 100 from a holder 210 when the release button 231 is in a release position, according to certain embodiments. When the release button 231 is in the release position, the front end of the release component 230a is inserted into the gap between the clamper interlocking component 223 and the spacer 222 which causes the clamper interlocking component 223 to be maintained at the lowermost state. When the clamper interlocking component 223 moves to the lowermost state, the clampers 214 and 215 also move to a lowermost state in the direction of arrow M5. The distance L3 between the front surfaces 214a and 215a is at a maximum that may be greater than the thickness L0 of the terminal device when the release button 231 is in the release position, which can limit the pinching force exerted by the clampers 214 and 215 on the terminal device 100. When the user pulls up on the terminal device 100 in the direction of arrow A3 to remove the terminal device 100 from the holder 210 when the release button 231 is in the release position, the clampers 214 and 215 do not restrict the movement of the terminal device 100.

When the terminal device 100 is inserted into the holder 210 and the release button 231 is in the locked position, the terminal device 100 is held in place by the pinching force exerted by the clampers 214 and 215. The pinching force that holds the terminal device 100 in place in the holder 210 is less than the maximum pinching force exerted by the clampers when the terminal device 100 is pulled upward in the direction of arrow A3 when the release button 231 is in the locked position. Therefore, the pinching force that holds the terminal device 100 in place in the holder 210 may ensure that the terminal device 100 does not inadvertently separate from the keyboard device 200. In addition, a likelihood of damaging the front and back surface of the terminal device 100 due to the pinching force of the clampers 214 and 215 is reduced. When the release button 231 is moved to the release position, the pinching force of the clampers 214 and 215 is at a minimum due to the maximum distance L3 between the front surfaces 214$a$ and 215$a$, which allows the user remove the terminal device 100 from the holder 210 of the keyboard device 200.

The holder 210 can accommodate terminal devices having a plurality of structures, sizes, shapes, and thicknesses. For example, in addition to the terminal device 100, the holder 210 can accommodate terminal devices and other electronic devices, such as a Smart Phone or personal digital assistant (PDA), with other shapes and thicknesses that can make contact with the clampers 214 and 215 when inserted into the holder 210.

In addition, the components and structure of the holder 210 described by the present disclosure are exemplary, and other structures of the holder 210 can be included that have at least one clamper-like component that holds the terminal device 100 in place by exerting a pinching force. When the holder 210 is in a locked position, the pinching force exerted by the at least one clamper-like is weaker when the terminal device 100 is inserted into the holder 210 than when the terminal device 100 is being pulled out of the holder 210. The holder 210 can also be attached to devices other than the keyboard device 200, such as a terminal device docking station, stand, charging station, and the like.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if components in the disclosed systems were combined in a different manner, or if the components were replaced or supplemented by other components.

The above disclosure also encompasses the embodiments noted below.

(1) A device, including: a holder attached to the casing that is configured to hold an edge of a terminal device; a first clamper arranged on a first wall of the holder; a second clamper arranged on a second wall opposing the first wall so that the first clamper faces the second clamper to exert a pinching force on the edge of the terminal device; and a clamper interlocking component that decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder.

(2) The device of (1), further including a keyboard having a casing with one or more keys arranged on a surface thereof.

(3) The device of (1) or (2), wherein front surfaces of the first and second clampers making contact with the edge of the terminal device are made of materials having coefficients of friction greater than a predetermined threshold.

(4) The device of any one of (1) to (3), wherein back surfaces of the first and second clampers are tapered surfaces at predetermined angles.

(5) The device of any one of (1) to (4), wherein the clamper interlocking component forces the first and second clampers to move upward and downward along the tapered surfaces to vary the pinching force exerted by the first and second clampers on the edge of the terminal device.

(6) The device of any one of (1) to (5), wherein a distance between front surfaces of the first and second clampers increases as the first and second clampers move downward and decreases as the first and second clampers move upward.

(7) The device of any one of (1) to (6), wherein the first and second clampers exert the pinching force on the edge of the terminal device when a release button is in a locked position.

(8) The device of any one of (1) to (7), further including a release component configured to limit the pinching force exerted by the first and second clampers when a release button is in a release position.

(9) The device of any one of (1) to (8), wherein the clamper interlocking component moves upward and downward due to a force exerted by a spring.

(10) The device of any one of (1) to (9), wherein a distance between front surfaces of the first and second clampers is greater than a thickness of the terminal device when the release component is limiting the pinching force of the first and second clampers on the edge of the terminal device.

(11) A system, including: a terminal device having a display; and a device configured to receive the terminal device having a holder attached to the casing that is configured to hold an edge of a terminal device, a first clamper arranged on a first wall of the holder, a second clamper arranged on a second wall opposing the first wall so that the first clamper faces the second clamper to exert a pinching force on the edge of the terminal device, and a clamper interlocking component that decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder.

(12) The system of (11), further including a keyboard having a casing with one or more keys arranged on a surface thereof.

(13) The system of (11) or (12), wherein front surfaces of the first and second clampers making contact with the edge of the terminal device are made of materials having coefficients of friction greater than a predetermined threshold.

(14) The system of any one of (11) to (13), wherein back surfaces of the first and second clampers are tapered surfaces at predetermined angles.

(15) The system of any one of (11) to (14), wherein the clamper interlocking component forces the first and second clampers to move upward and downward along the tapered surfaces to vary the pinching force exerted by the first and second clampers on the edge of the terminal device.

(16) The system of any one of (11) to (15), wherein a distance between front surfaces of the first and second clampers increases as the first and second clampers move downward and decreases as the first and second clampers move upward.

(17) The system of any one of (11) to (16), wherein the first and second clampers exert the pinching force on the edge of the terminal device when a release button is in a locked position.

(18) The system of any one of (11) to (17), further comprising a release component configured to limit the pinching force exerted by the first and second clampers when a release button is in a release position.

(19) The system of any one of (11) to (18), wherein the clamper interlocking component moves upward and downward due to a force exerted by a spring.

(20) The system of any one of (11) to (19), wherein a distance between front surfaces of the first and second clampers is greater than a thickness of the terminal device when the release component is limiting the pinching force of the first and second clampers on the edge of the terminal device.

The invention claimed is:

1. A device, comprising:
    a holder attached to a casing that is configured to hold an edge of a terminal device;
    a first clamper arranged on a first wall of the holder;
    a second clamper arranged on a second wall opposing the first wall so that the first clamper faces the second clamper to exert a pinching force on the edge of the terminal device; and
    a clamper interlocking component that decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder,
    wherein the clamper interlocking component moves upward and downward in a direction substantially parallel to front surfaces of the first and second clampers which make contact with the edge of the terminal device when the edge of the terminal device is inserted.

2. The device of claim 1, further comprising a keyboard having the casing with one or more keys arranged on a surface thereof.

3. The device of claim 1, wherein the front surfaces of the first and second clampers are made of materials having coefficients of friction greater than a predetermined threshold.

4. The device of claim 1, wherein back surfaces of the first and second clampers are tapered surfaces at predetermined angles.

5. The device of claim 4, wherein the clamper interlocking component forces the first and second clampers to move upward and downward along the tapered surfaces to vary the pinching force exerted by the first and second clampers on the edge of the terminal device.

6. The device of claim 5, wherein a distance between the front surfaces of the first and second clampers increases as the first and second clampers move downward and decreases as the first and second clampers move upward.

7. The device of claim 1, wherein the first and second clampers exert the pinching force on the edge of the terminal device when a release button is in a locked position.

8. The device of claim 1, further comprising a release component configured to limit the pinching force exerted by the first and second clampers when a release button is in a release position.

9. The device of claim 1, wherein the clamper interlocking component moves upward and downward due to a force exerted by a spring.

10. The device of claim 8, wherein a distance between the front surfaces of the first and second clampers is greater than a thickness of the terminal device when the release component is limiting the pinching force of the first and second clampers on the edge of the terminal device.

11. A system, comprising:
    a terminal device having a display; and
    a device configured to receive the terminal device having
        a holder attached to a casing that is configured to hold an edge of a terminal device,
        a first clamper arranged on a first wall of the holder,
        a second clamper arranged on a second wall opposing the first wall so that the first clamper faces the second clamper to exert a pinching force on the edge of the terminal device, and
        a clamper interlocking component that decreases the pinching force exerted by the first and second clampers when the edge of the terminal device is inserted toward a bottom surface of the holder, and increases the pinching force exerted by the first and second clampers when the edge of the terminal device is pulled away from the bottom surface of the holder,
        wherein the clamper interlocking component moves upward and downward in a direction substantially parallel to front surfaces of the first and second clampers which make contact with the edge of the terminal device when the edge of the terminal device is inserted.

12. The system of claim 11, further comprising a keyboard having the casing with one or more keys arranged on a surface thereof.

13. The system of claim 11, wherein the front surfaces of the first and second clampers making are made of materials having coefficients of friction greater than a predetermined threshold.

14. The system of claim 11, wherein back surfaces of the first and second clampers are tapered surfaces at predetermined angles.

15. The system of claim 14, wherein the clamper interlocking component forces the first and second clampers to move upward and downward along the tapered surfaces to vary the pinching force exerted by the first and second clampers on the edge of the terminal device.

16. The system of claim 15, wherein a distance between the front surfaces of the first and second clampers increases as the first and second clampers move downward and decreases as the first and second clampers move upward.

17. The system of claim 11, wherein the first and second clampers exert the pinching force on the edge of the terminal device when a release button is in a locked position.

18. The system of claim 11, further comprising a release component configured to limit the pinching force exerted by the first and second clampers when a release button is in a release position.

19. The system of claim 11, wherein the clamper interlocking component moves upward and downward due to a force exerted by a spring.

20. The system of claim 18, wherein a distance between the front surfaces of the first and second clampers is greater than a thickness of the terminal device when the release component is limiting the pinching force of the first and second clampers on the edge of the terminal device.

\* \* \* \* \*